US009442130B2

United States Patent
Karr et al.

(10) Patent No.: US 9,442,130 B2
(45) Date of Patent: Sep. 13, 2016

(54) DETECTION OF SHOCK IN DETECTOR ELECTRONICS

(71) Applicant: Toshiba Medical Systems Corporation, Otawara-shi (JP)

(72) Inventors: Alan Karr, Lake Barrington, IL (US); Daniel McGowan, Wauconda, IL (US); Gin Chung Wang, Grayslake, IL (US)

(73) Assignee: Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 14/483,465

(22) Filed: Sep. 11, 2014

(65) Prior Publication Data

US 2016/0077124 A1    Mar. 17, 2016

(51) Int. Cl.
*G01P 15/00*    (2006.01)
*G01T 1/29*    (2006.01)
*G01T 7/00*    (2006.01)

(52) U.S. Cl.
CPC ............ *G01P 15/00* (2013.01); *G01T 1/2985* (2013.01); *G01T 7/00* (2013.01)

(58) Field of Classification Search
CPC ............................ G01P 15/00; G01T 1/2985
See application file for complete search history.

(56) References Cited

U.S. PATENT DOCUMENTS

| 8,459,869 B2 * | 6/2013 | Enomoto ...................... 378/207 |
| 8,642,967 B2 * | 2/2014 | Iwakiri et al. ............ 250/361 R |
| 2006/0239415 A1 * | 10/2006 | Liu et al. ..................... 378/207 |
| 2011/0018541 A1 * | 1/2011 | Solf et al. ..................... 324/322 |

FOREIGN PATENT DOCUMENTS

JP    2007-333547 A    12/2007

* cited by examiner

*Primary Examiner* — Marcus Taningco
(74) *Attorney, Agent, or Firm* — Oblon, McClelland, Maier & Neustadt, L.L.P.

(57) ABSTRACT

A shock detection device for a detector array includes an accelerometer mounted on the detector array to detect vibrations. The shock detection device also includes an electronic memory to store data from the accelerometer. The data corresponds to detected vibrations that exceed an active threshold of the accelerometer. The shock detection device also includes a power supply that is separate from the power supply of the detector array.

15 Claims, 5 Drawing Sheets

DETECTION OF SHOCK IN DETECTOR ELECTRONICS

FIELD

Embodiments described herein generally relate to shock detection devices for detection of shocks and/or impact to detector electronics used in medical imaging.

BACKGROUND

The repair of detector arrays included in positron emission tomography (PET) systems can be quite costly. Damage to such detector arrays during transport or as a result of incorrect operation can be difficult to detect resulting in significant down time for these systems due to lengthy calibration and debugging. Moreover, significant cost can be incurred by both the manufacturer and the customer if a detector array of a PET system must be replaced as a result of the damage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

In certain exemplary applications, a shock detection device is attached to a detector array of a PET system in order to determine whether the detector array is subjected to potentially damaging shock or impact during transport and/or as a result of incorrect operation.

According to a first exemplary embodiment, a shock detection device for a detector array includes an accelerometer mounted on the detector array to detect vibration of the detector array. The shock detection device also includes an electronic memory to store data from the accelerometer which corresponds to detected vibration when the detected vibration exceeds an active threshold of the accelerometer. A power supply is also included in the shock detection device to power the device.

In another exemplary embodiment, the accelerometer includes a first threshold for shock detection during transport of the detector array and a second threshold for shock detection when the detector array is stationary.

In another exemplary embodiment, interface circuitry is included in the shock detection device to interface with an external device in order to select the first or second threshold as the active threshold of the accelerometer. The accelerometer then indicates a shock when detected vibrations exceed the active threshold.

In another exemplary embodiment, the shock detection device also includes a real-time clock circuit to output a time stamp. The shock detection device then stores the data from the accelerometer in association with the time stamp.

In another exemplary embodiment, the shock detection device includes a mechanical accelerometer in addition to or in place of the accelerometer. The mechanical accelerometer changes color in response to a vibration of a predetermined magnitude. Specifically, the mechanical accelerometer is white when no shock is detected and a color other than white when shock is detected.

In another exemplary embodiment, the electronic memory of the shock detection device is an electrically erasable programmable read only memory (EEPROM).

In another exemplary embodiment, the power supply of the shock detection device is independent of a power supply of the detection array.

In another exemplary embodiment, the power supply of the shock detection device is a battery.

In another exemplary embodiment, the detector array is a positron emission tomography (PET) detector array including a plurality of detectors and a crystal array, and the shock detection device is disposed on a side of the detectors opposite to the crystal array.

In another exemplary embodiment, the interface circuitry of the shock detection device interfaces with a PET system that includes the PET detector array, and generates a warning flag when the accelerometer detects the shock.

In another exemplary embodiment, shock detection method for a detector array includes disposing a shock detection device on the detector array, and detecting vibration of the detector array using an accelerometer of the shock detection device. The method also includes comparing the detected vibration to an active threshold of the accelerometer, and storing data from the accelerometer corresponding to the detected vibration when the detected vibration exceeds the active threshold.

In another exemplary embodiment, the accelerometer includes a first threshold for shock detection during transport of the detector array and a second threshold for shock detection when the detector array is stationary and the method includes setting the first or second threshold as the active threshold.

In another exemplary embodiment, the method includes storing, in the electronic memory, the data from the accelerometer in association with time stamps generated from a real-time clock included in the detection device.

In another exemplary embodiment, the method includes determining whether the detector array has received a shock based on the data stored in the electronic memory, and determining a party having custody of the detector array at a time of the shock based on the time stamps stored in the electronic memory.

In a further exemplary embodiment, a detector array includes an array of crystals that generate light in response to impinging radiation, and detectors that detect the light generated by the array of crystals. The detector array also includes a shock detection device that includes an accelerometer mounted on the detector array and which detects vibration of the detector array. The shock detection device also includes an electronic memory that stores data from the accelerometer corresponding to the detected vibration when the detected vibration exceeds an active threshold of the accelerometer, and a power supply that powers the shock detection device.

Figure 1:
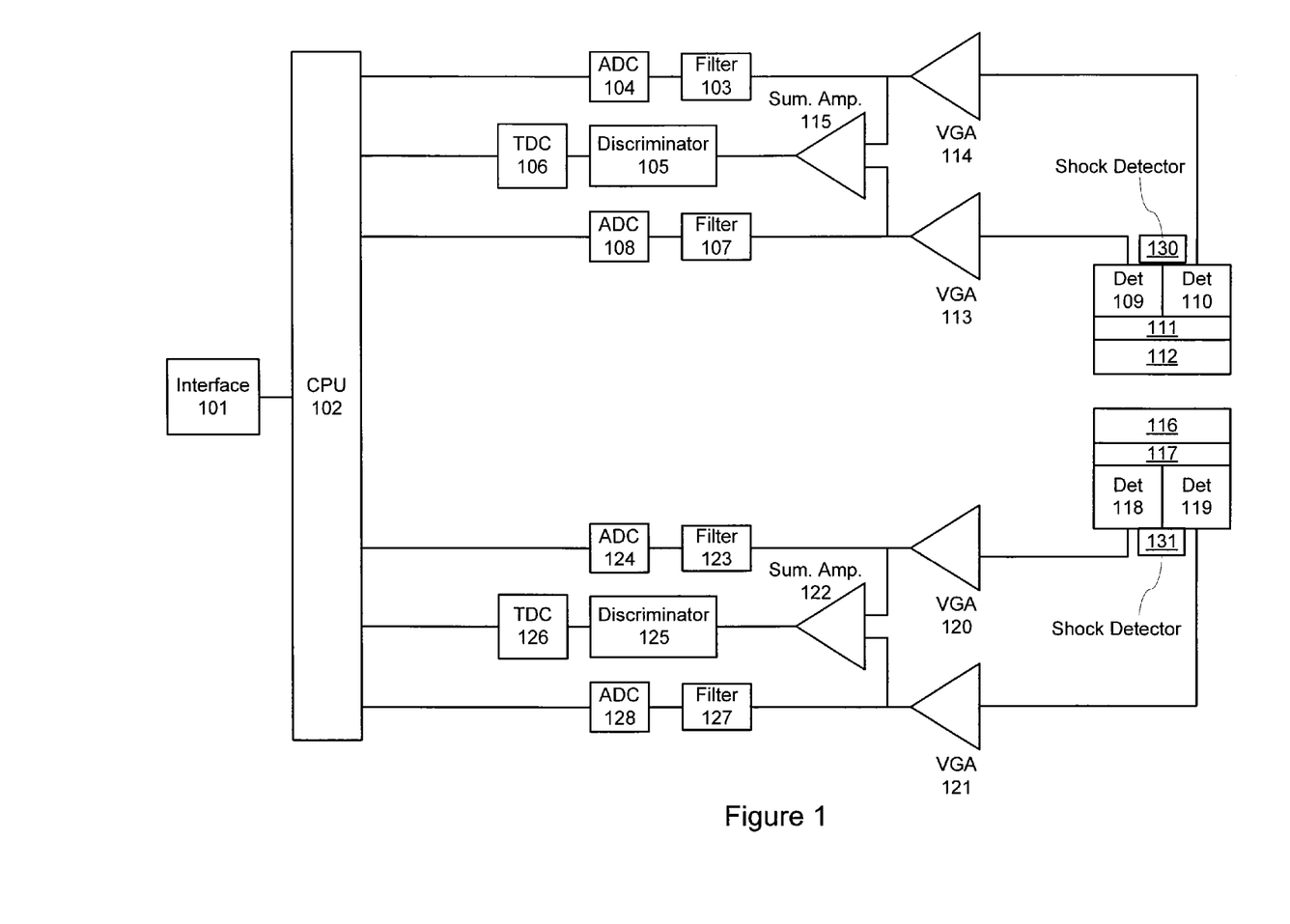
FIG. 1 is a schematic diagram of a PET system according to exemplary embodiments of the present disclosure.

Referring now to the drawings, wherein like reference numerals designate identical or corresponding parts throughout the several views, FIG. 1 is a schematic diagram of a PET system according to exemplary embodiments of the present disclosure. In FIG. 1, a detector array includes detectors 109 and 110, which can be photomultipliers, that are arranged over a crystal array 112, which can be an array of scintillation crystals, with a light guide 111 in between the two. The PET system in FIG. 1 also includes a second detector array formed of detectors 118 and 119, crystal array 116 and light guide 117. Though FIG. 1 illustrate the detector arrays as having two detectors, one of ordinary skill in the art would recognize that such detector arrays can have any number of detectors without departing from the scope of the present disclosure.

In FIG. 1, when gamma rays are emitted from a body under test (not shown), the gamma rays travel in opposite directions. Thus, gamma ray detection occurs simultaneously at each crystal array 112 and 116. This causes at least a subset of the crystals in the crystal arrays 112 and 116 to emit scintillation light which then is directed by a corresponding light guide 111 and 117 to the detectors 109 and 110 and the detectors 118 and 119, respectively.

In one detector array, the detectors 109 and 110 generate electronic signals based on detection of the scintillation light from the crystal array 112, and the electronic signals are then amplified by the variable gain amplifiers 113 and 114. The variable gain amplifiers act as signal buffers and permit the PET system to compensate for variable detector gains which occur due to variability in the manufacturing process. The variable gain amplifiers 113 and 114 may be fully analog circuits with their gain adjusted through the use of components such as potentiometers, or may incorporate digital potentiometers to allow their respective gains to be set by, for example, the central processing unit (CPU) 102. The gain of the variable gain amplifiers 113 and 114 may also be set manually during calibration of the detector array or may be automatically set by the CPU 102 using a predefined algorithm based on the output of detectors 109 and 110.

The output of the variable gain amplifiers 113 and 114 are provided to a summing amplifier 115 which sums the two signals and provides the result to a discriminator circuit 105 that produces a pulse when the signal from the summing amplifier 115 reaches a predetermined threshold. The output of the discriminator circuit 105 is provided to a time-to-digital converter (TDC) 106, which produces a digital output encoding an arrival time of the discriminator pulse relative to a system clock (not shown.)

The output of the variable gain amplifiers 113 and 114 are also respectively provided to filters 107 and 103, which optimize signal-to-noise ratios of the signals, and then to analog-to-digital converters 108, 104 that convert signal amplitudes to digital values. As can be appreciated, the filter may be analog or digital and may have a band pass configuration or a cascaded high pass/low pass configuration. The pass band of the filters 107, 103 are chosen to be centered on the frequency range of the expected signal. The analog-to-digital converters 108 and 104 may be free running converters, in which case the CPU 102 performs signal integration for each signal, or may be peak-sensing, in which case signal integration is performed by the analog-to-digital converters themselves.

Though the above description is of the circuit branch associated with the detector array formed by detectors 109, 110, light guide 111 and crystal array 112, one of ordinary skill in the art would recognize that the description also applies to the circuit branch associated with the detector array formed by detectors 118, 119, light guide 117 and crystal array 116. Further, the circuitry described above may be implemented as discrete circuit components or as part of a single integrated circuit, such as an application specific integrated circuit (ASIC).

The signals from both detector arrays and associated circuitry are provided to the CPU for analysis and provision to other parts of the PET system, such as a storage medium (not shown) or a display (not shown) via the interface circuit 101. The CPU may be implemented as discrete logic gates, as an ASIC, as a field programmable gate array (FPGA) or other complex logic device (CPLD). The interface circuit may be any circuit that interfaces devices together, such as a universal serial bus (USB), firewire, parallel port, Ethernet, and the like and further descriptions of these circuits are omitted for brevity.

In FIG. 1, each detector array includes a shock detection device 130, 131. The shock detection devices are mounted on the detectors of their respective detector arrays. For example, FIG. 1 illustrates shock detection device 130 mounted on detectors 109, 110 at a side opposite to the array of crystals 112. However, the shock detection device 130 may also be mounted on a side of the detectors 109, 110 that is perpendicular to a face of the array of crystals 112. Though only one shock detection device 130, 131 per detector array is illustrated, additional shock detection devices may be affixed to each detector array without departing from the scope of the present disclosure. As such, the number of shock detection devices mounted on each detector in no way limits the present disclosure.

Figure 2:
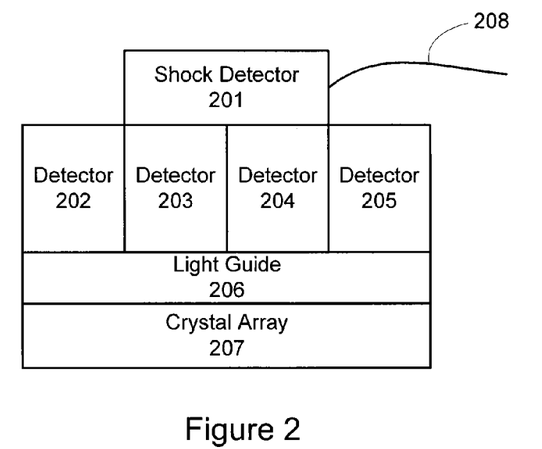
FIG. 2 is a diagram of a detector array with a shock detection device mounted thereon according to exemplary embodiments of the present disclosure.

FIG. 2 is a diagram of a detector array according to an exemplary embodiment of the present disclosure. In FIG. 2, the detectors 202, 203, 204 and 205 are mounted on a light guide 206 that is mounted on a crystal array 207. Though crystal array is shown as one piece, one of ordinary skill in the art would recognize that the crystal array 207 can be formed by multiple individual crystals.

A shock detection device 201 is mounted over detectors 203 and 204, but as noted above, the specific mounting location of the shock detection device 201 is not limiting upon the present disclosure. The shock detection device 201 includes cabling 208 to connect it to an external device, such as the CPU 102 illustrated in FIG. 1. In this way, the shock detection device is able to communicate data relating to shocks, impacts and vibrations experienced by the detector array.

Figure 3:
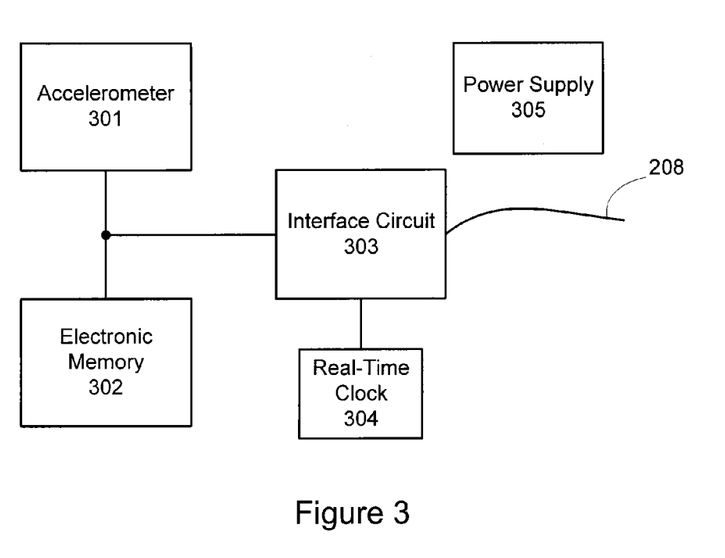
FIG. 3 is a schematic diagram of the circuitry of a shock detection device according to exemplary embodiments of the present disclosure.

FIG. 3 is a schematic drawing of the circuitry of the shock detection device 201 according to exemplary aspects of the present disclosure. The shock detection device includes an accelerometer 301 connected to an electronic memory 302 and an interface circuit 303. A real-time clock 304 is also connected to the interface circuit 303, which also connects to the cabling 208 that connects the shock detection device 201 to external devices. The shock detection device 305 also includes a power supply 305 that is independent of the power supply of the PET system so that the shock detection device 201 may operate while the PET system is disconnected from power, such as when it is being transported from one location to another. In this regard, the power supply 305 of the shock detection device can be a battery, such as a lithium ion battery, a nickel metal hydride (NiMH) battery or the like. Other sources of power may also be possible without departing from the scope of the present disclosure.

The accelerometer 301 detects vibrations that may result from shock or impact that the detector array may receive while being transported, or that the detector array may receive because of incorrect operation. As such, the accelerometer 301 may be capacitive, piezoelectric, microelectromechanical systems (MEMS), gyroscopic or a strain gauge. Other types of accelerometers are also possible without departing from the scope of the present disclosure. The accelerometer 301 may also have associated circuitry for biasing and to process the raw accelerometric signal. Interface circuitry may also be provided to allow the accelerometer 301 to write data directly to the electronic memory 302. Alternatively, the signal processing of the accelerometric signal and writing thereof into electronic memory 302 may be performed by the interface circuit 303.

The accelerometer 301 may also have a settable threshold for detecting shock. That is, a threshold that determines whether a magnitude and/or duration of detected vibrations is large enough to cause damage to the detector array. In this case circuitry may be provided as, for example, part of the interface circuit 303, to determine whether accelerometric signals corresponding to a detected vibration surpass the threshold. If so, the circuitry may store corresponding data into the electronic memory 302. Data that does not surpass the threshold may be discarded to avoid filling the electronic memory 302. This advantageously allows the use of a smaller electronic memory.

The accelerometer 301 may also have more than one threshold. For example, the accelerometer 301 may have a first threshold that is used when the detector array is being transported and second when the detector array is stationary. The first threshold may be set lower than the second to account for relatively benign vibration that are to be expected during transportation of a detector array from, for example, the factory to customer premises. In this case, the interface circuit 303 may also allow selection between the first and second thresholds directly or via the cabling 208 that connects to the external device. For example, the interface circuit 303 may include a switch that may have one position for the first threshold and another position for the second threshold, or the interface circuit 303 may receive a command from the CPU 102 via the cabling 208 to set a threshold. Once the first or second threshold is selected, it becomes the active threshold of the accelerometer against which all detected vibrations are compared.

As can be appreciated, the electronic memory 302 may be an electronically erasable read only memory (EEPROM), static random access memory (SRAM) or FLASH memory. The electronic memory 302 may also store instructions for operation of the interface circuit 303. As such the interface circuit 303 may be a processor, such as a microcontroller, which executes the instructions. The interface circuit 303 may also be formed by discrete logic components, programmable logic devices (PLD's), complex programmable logic devices (CPLDs) or field programmable gate arrays (FPGA's). Supporting circuitry, such as buffers, amplifiers, switches and circuit protection devices may also be included without departing from the scope of the present disclosure.

The shock detection device in FIG. 3 also includes a real-time clock circuit 304 that maintains a current time of day. When data from the accelerometer 301 is written to the electronic memory 302, the data may be stored along with an associated time stamp from the real-time clock circuit 304 corresponding to a time when the data was measured. This advantageously facilitates the determination of the party in custody of the detector array at the time that a potentially damaging shock occurred by comparing the corresponding time stamp to shipping records (i.e., bills of lading, signed delivery receipts, etc.)

Figure 4:
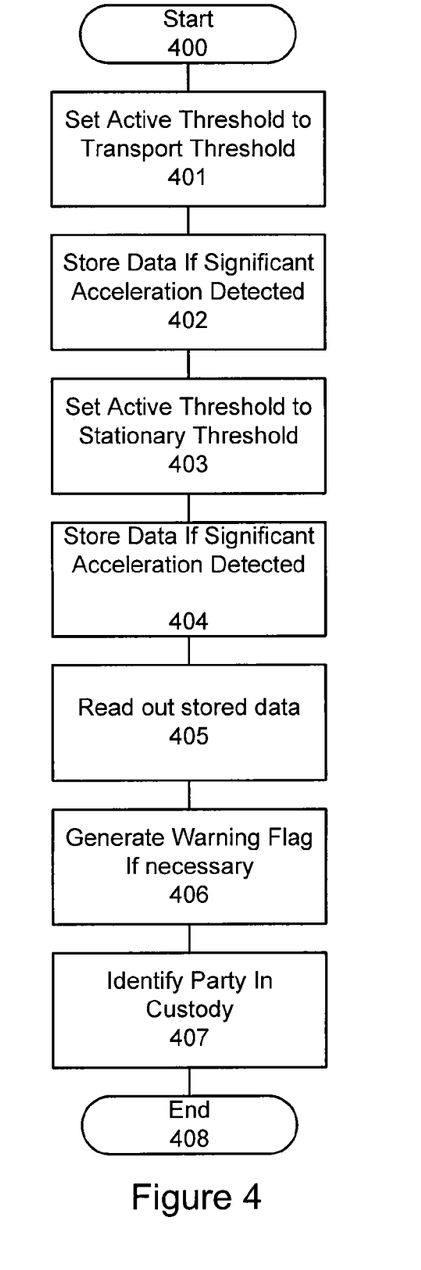
FIG. 4 is an algorithmic flow chart of determining whether a detector array has been subjected to shock according to exemplary embodiments of the present disclosure.

FIG. 4 is an algorithmic flow chart of a process using a shock detection device according to an exemplary embodiment of the present disclosure. In FIG. 4, the process begins at step 400. At step 401, the active threshold of the accelerometer is set to be the first threshold, which is the threshold used when transporting the detector array. At step 402, data corresponding to significant shocks, i.e., those that surpass the threshold, is stored in the electronic memory 302. Steps 401 and 402 are performed during transport of the detector array from, for example, a manufacturing site to a customer site.

At step 403, the active threshold of the accelerometer 301 is set to the second threshold, which is used when the detector array will be stationary. Setting of the active threshold to the second threshold may be performed as part of the installation of the detector array, after installation of the detector array or as part of a calibration process. At step 404 data corresponding to significant shocks, i.e., those that surpass the second threshold are stored in the electronic memory 302.

At step 404, the data stored in the electronic memory is read out by, for example, the interface circuit 303, and a warning flag is generated at step 406 indicating that potentially damaging shock(s) has been received by the detector array. The warning flag may be provided to the CPU 102 via the cabling 208 in order to alert an operator of the PET system, for example.

At step 407 a time stamp associated with the shock(s) stored in the electronic memory 302 is compared to shipping records to determine the identity of the party that had custody of the PET system, including the detector array, at the time of the shock. As can be appreciated, the comparison may be performed by the PET system itself if access to electronic versions of the shipping records is provided via, for example, the internet. At step 408 the process ends.

Figure 5:
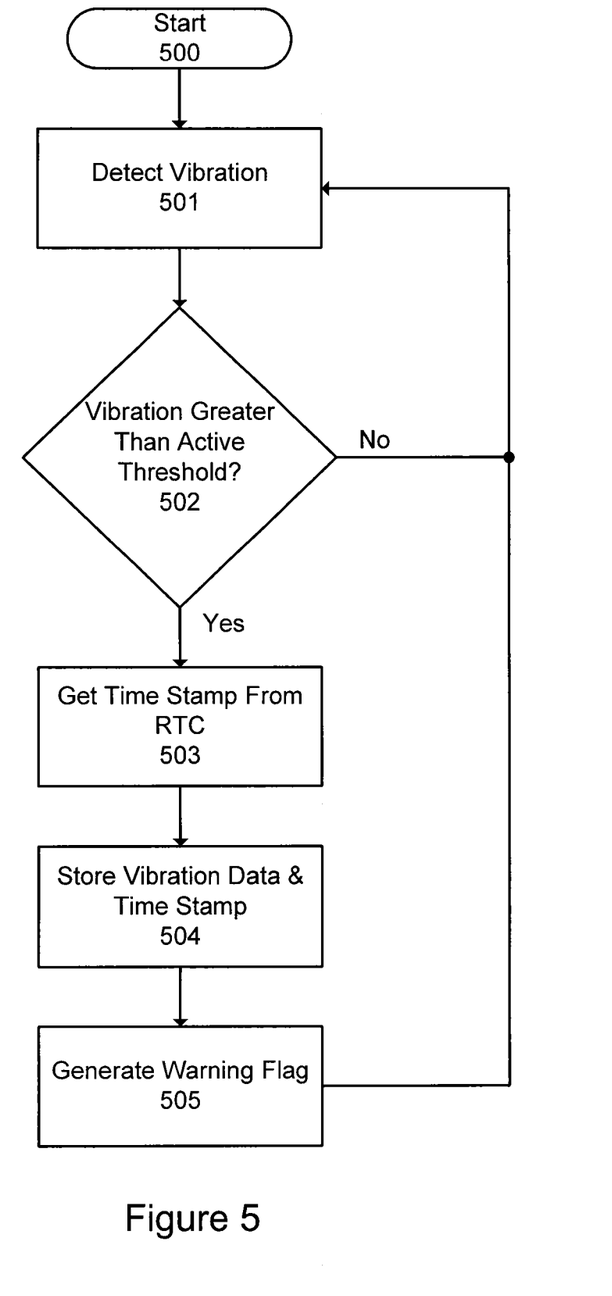
FIG. 5 is an algorithmic flow chart of the process performed by the shock detection device according to exemplary embodiments of the present disclosure.

FIG. 5 is an algorithmic flowchart of a process performed by a shock detection device according to exemplary aspects of the present disclosure. At step 500 the process starts. At step 501 the accelerometer 301 detects vibration of the detector array and outputs a corresponding signal. The magnitude of the signal is compared to the active threshold of the accelerometer 301 at step 502. If the magnitude of the signal is less than the threshold, the process reverts to step 501 to detect additional vibrations. Otherwise, if the magnitude of the signal is greater than the active threshold, the process moves to step 503.

At step 503, a time stamp is obtained from the real-time clock circuit 304, and at step 504 data from the vibration and the associated time stamp are stored in the electronic memory 302. Then at step 505 a warning flag is generated by the interface circuitry 303 and provided to the PET system via the cabling 208. Then the process reverts to step 501 to detect additional vibrations.

Of course, several modifications to the above process are possible. For example, several data readings and associated time stamps may be stored in the electronic memory 302 before a warning flag is generated, or the shock detection device may not generate a warning flag at all. In that case, the CPU 102 of the PET system may periodically retrieve stored vibration data from the electronic memory 303 and determine and generate a warning flag based on analysis thereof. Alternatively, the shock detection device may generate an audible and/or visual alarm when a potentially damaging shock is received. An operator of the PET system may then instruct the system to retrieve the data from the shock detection device in order to conduct further analysis.

In another exemplary embodiment, no warning is provided by the shock detection device. Instead, upon malfunction of the detector array or upon detection of damage of the detector array, the shock detection device may be polled to determine whether the malfunction or damage could be a result of a shock or impact to the detector device. Thus, the descriptions above with respect to FIGS. 4-5 are merely exemplary.

Figure 6:
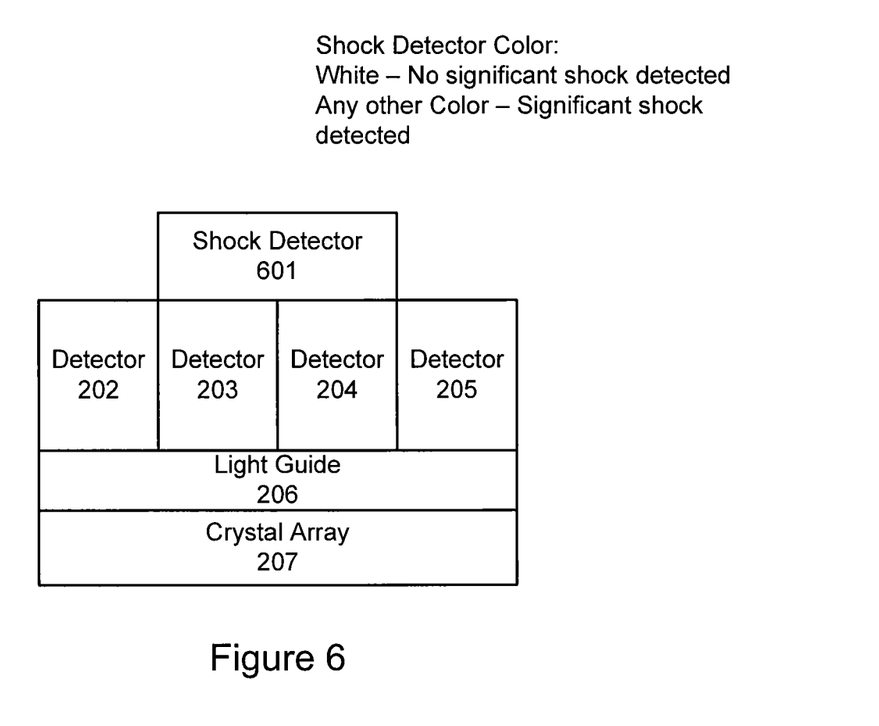
FIG. 6 is a diagram of a detector array with another shock detection device according to exemplary embodiments of the present disclosure.

FIG. 6 is another detector array according to another exemplary embodiment of the present disclosure. The detectors 202, 203, 204, 205, the crystal array 207 and the light guide 206 are the same as those described above with respect to FIG. 2. However, the shock detection device 601 includes a mechanical accelerometer, such as an impact detector, that detects high acceleration. The mechanical accelerometer may provide an indication of a shock or impact through a color change. For example, the mechanical accelerometer may be white when no shock or impact has been received, but may change to any other color when a potentially damaging shock or impact has been received by the detector array. Thus, as part of a periodic inspection of the detector array, a technician may record the color of the mechanical accelerometer of the shock detection device to monitor whether the detector array has been subjected to damaging vibrations.

The shock detection device 601 may also include the circuit components of the shock detection device 201 to record vibration data and generate warning flags as discussed above. In a shock detection device that includes both a mechanical accelerometer and an electrical accelerometer, the mechanical accelerometer may be used to determine whether the vibration data stored in the electronic memory 302 should be checked. If the mechanical accelerometer is white, the detector array has not been subjected to potentially damaging shocks or impacts and therefore there is no need to retrieved vibration data from the electronic memory 302. On the other hand, if the mechanical accelerometer is any color other than white, a potentially damaging shock or impact has been received, and the contents of the electronic memory 302 should be analyzed.

In a further exemplary embodiment, multiple shock detectors including both the circuitry of shock detector 201 and the mechanical accelerometer of shock detector 601 may be placed at different locations in the detector array. As such, the change in color of the mechanical accelerometer may be used to quickly determine which shock detection devices should be electronically polled to retrieve their vibration data for further analysis.

In another exemplary embodiment, shock detection devices 201 and shock detection devices 601 may be distributing within a detector array. In this case, the shock detection devices 601 may be visually inspected to determine an area of impact based on which shock detection devices 601 have mechanical accelerometers that have changed color. Then only those shock detection devices 201 that are within the area of impact need to be polled to retrieve their respective vibration data for further analysis.

Obviously, numerous modifications and variations of the present invention are possible in light of the above teachings. It is therefore to be understood that within the scope of the appended claims, the invention may be practiced otherwise than as specifically described herein.

The invention claimed is:

1. A shock detection device for a detector array, comprising:
   an accelerometer mounted on the detector array and configured to include a first threshold for shock detection during transport of the detector array and a second threshold for shock detection when the detector array is stationary and to detect vibration of the detector array;
   interface circuitry configured to interface with an external device in order to select one of the first and second thresholds as an active threshold;
   an electronic memory configured to store data from the accelerometer corresponding to the detected vibration when the detected vibration exceeds an active threshold of the accelerometer; and
   a power supply configured to power the shock detection device,
   wherein the accelerometer indicates a shock when detected vibrations exceed the active threshold, and
   the detector array is a positron emission tomography (PET) detector array including a plurality of detectors and a crystal array, and the shock detection device is disposed on a side of the detectors opposite to the crystal array.

2. The shock detection device according to claim 1, further comprising:
   a real-time clock circuit configured to output a time stamp, and the data from the accelerometer is stored in the electronic memory in association with a corresponding time stamp.

3. The shock detection device according to claim 1, further comprising:
   a mechanical accelerometer configured to change color in response to a vibration of a predetermined magnitude, wherein the mechanical accelerometer is white when no shock is detected and a color other than white when shock is detected.

4. The shock detection device according to claim 1, wherein the electronic memory is an electrically erasable programmable read only memory (EEPROM).

5. The shock detection device according to claim 1, wherein the power supply of the shock detection device is independent of a power supply of the detection array.

6. The shock detection device according to claim 5, wherein the power supply of the shock detection device is a battery.

7. The shock detection device according to claim 1, wherein the interface circuitry interfaces with a PET system that includes the PET detector array, and the interface circuitry generates a warning flag when the accelerometer detects the shock.

8. A shock detection method for a detector array, comprising:
   disposing a shock detection device on the detector array;
   detecting vibration of the detector array using an accelerometer of the shock detection device;
   comparing the detected vibration to an active threshold of the accelerometer; and
   storing data from the accelerometer corresponding to the detected vibration when the detected vibration exceeds the active threshold,
   wherein the detector array is a positron emission tomography (PET) detector array.

9. The shock detection method according to claim 8, wherein the accelerometer includes a first threshold for shock detection during transport of the detector array and a second threshold for shock detection when the detector array is stationary.

10. The shock detection method according to claim 9, further comprising:
setting the active threshold as one of the first threshold and the second threshold.

11. The shock detection method according to claim 8, further comprising:
storing, in the electronic memory, the data from the accelerometer in association with time stamps generated from a real-time clock included in the detection device.

12. The shock detection method according to claim 11, further comprising:
determining whether the detector array has received a shock based on the data stored in the electronic memory; and
determining a party having custody of the detector array at a time of the shock based on the time stamps stored in the electronic memory.

13. A detector array, comprising:
an array of crystals configured to generate light in response to impinging radiation;
an plurality of detectors configured to detect the light generated by the array of crystals; and
a shock detection device disposed on the detector array and including
an accelerometer mounted on the detector array and configured to detect vibration of the detector array,
an electronic memory configured to store data from the accelerometer corresponding to the detected vibration when the detected vibration exceeds an active threshold of the accelerometer,
interface circuitry configured to interface with an external device in order to select as the active threshold one of a first threshold for shock detection during transport of the detector array, and a second threshold for shock detection when the detector array is stationary, and
a power supply configured to power the shock detection device,
wherein the external device is a positron emission tomography (PET) system that controls the detector array.

14. The detector array according to claim 13, wherein the plurality of detectors include photo multiplier tubes that detect scintillation light from the array of crystals.

15. The detector array according to claim 13, wherein the shock detection device further includes a real-time clock circuit configured to generate a time stamp of a current time, and the data from the accelerometer is stored in the electronic memory in association with the time stamp.

* * * * *